United States Patent
Nyström

(10) Patent No.: US 11,590,847 B2
(45) Date of Patent: Feb. 28, 2023

(54) DISCONNECTION OF VEHICLE ELECTRIC SYSTEM USING LOW VOLTAGE SWITCH

(71) Applicant: VOLVO TRUCK CORPORATION, Gothenburg (SE)

(72) Inventor: Mats Nyström, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/363,917

(22) Filed: Jun. 30, 2021

(65) Prior Publication Data

US 2022/0001747 A1 Jan. 6, 2022

(30) Foreign Application Priority Data

Jul. 1, 2020 (EP) ..................................... 20183462

(51) Int. Cl.
 *B60L 3/04* (2006.01)
 *B60L 3/00* (2019.01)

(52) U.S. Cl.
 CPC ............... *B60L 3/04* (2013.01); *B60L 3/0061* (2013.01)

(58) Field of Classification Search
 CPC ............. B60L 3/0061; B60L 3/00; B60L 3/04
 See application file for complete search history.

(56) References Cited

U.S. PATENT DOCUMENTS

| 5,534,364 | A | * | 7/1996 | Watanabe | ............. | H01M 50/20 |
| | | | | | | 429/150 |
| 9,327,601 | B2 | | 5/2016 | Demmerle et al. | | |
| 2014/0062180 | A1 | * | 3/2014 | Demmerle | .............. | B60L 58/00 |
| | | | | | | 307/9.1 |
| 2014/0320299 | A1 | * | 10/2014 | Kirk | ......................... | H01H 9/54 |
| | | | | | | 340/691.8 |
| 2019/0128948 | A1 | | 5/2019 | Smith et al. | | |

FOREIGN PATENT DOCUMENTS

| DE | 102009036672 A1 | 5/2010 | | |
| DE | 102017221935 A1 | 6/2019 | | |
| EP | 2489541 A1 | 8/2012 | | |
| EP | 2908387 A1 | 8/2015 | | |
| WO | WO-2018050254 A1 | * | 3/2018 | ................ B60L 3/04 |

OTHER PUBLICATIONS

European Search Report dated Nov. 20, 2020 in corresponding European Patent Application No. 20183462.9, 10 pages.

* cited by examiner

*Primary Examiner* — Jared Fureman
*Assistant Examiner* — Duc M Pham
(74) *Attorney, Agent, or Firm* — Venable LLP; Jeffri A. Kaminski

(57) ABSTRACT

A power system (100, 200) for a vehicle, the power system comprising: a hazardous voltage interlock loop (HVIL) circuit (106) configured to disconnect a high-voltage energy source (102) from a high-voltage system (104); a low-voltage energy source (108) coupled to the HVIL-circuit for supplying operational power to the HVIL-circuit; and a circuit breaker (110) operable to break a connection between the low-voltage energy source and the HVIL circuit, wherein the HVIL-circuit is configured to disconnect the high-voltage energy source from the high-voltage system if the low-voltage energy source is disconnected from the HVIL-circuit.

12 Claims, 2 Drawing Sheets

DISCONNECTION OF VEHICLE ELECTRIC SYSTEM USING LOW VOLTAGE SWITCH

TECHNICAL FIELD

The invention relates to a safety system in an electrical vehicle. In particular, the invention relates to a system and method for disconnecting a high-voltage power source from a high-voltage system in an electrical vehicle.

The invention is applicable in electrical and hybrid vehicles within the fields of trucks, buses, industrial construction machines and the like. Although the invention will be described with reference to a truck, the invention is not restricted to this particular vehicle, but may also be used in other electric vehicles.

BACKGROUND

In vehicles comprising electrical or hybrid drive systems, it is important to be able to safely disconnect the high-voltage energy source from the other high-voltage vehicle systems, for example for allowing the vehicle to be serviced and repaired in a secure manner. There are typically ways of manually shutting down or otherwise disconnection the high-voltage system. However, due to the potentially great hazards of working with a high-voltage system that has not been properly shut down, back-up systems for ensuring that no high-voltage components are accessible to a user are desirable.

Moreover, in the event of an accident, rescue personnel need to ensure that the high-voltage components of the vehicle are disconnected from the high-voltage power source in order to prevent personnel from being exposed to hazardous voltage levels. A known approach for disconnecting the high-voltage energy source is the use of a High Voltage Interlock Loop (HVIL) which is implemented to ensure that the high-voltage system can be de-energized and thereby safely disconnected.

However, in an emergency situation it might be difficult to locate and to find a suitable place to open the break the connection to the high-voltage system. Accordingly, it is desirable to provide an improved system for securely disconnecting a high-voltage energy source in a vehicle.

SUMMARY

An object of the invention is to provide an improved system for providing safe shut-off of a high-voltage system in a vehicle.

According to a first aspect of the invention, there is provided a power system for a vehicle. The power system comprises: a hazardous voltage interlock loop (HVIL) circuit configured to disconnect a high-voltage energy source from a high-voltage system powered by the high-voltage energy source, a low-voltage energy source coupled to the HVIL-circuit for supplying operational power to the HVIL-circuit; and a circuit breaker operable to break a connection between the low-voltage energy source and the HVIL circuit. The HVIL-circuit is further configured to disconnect the high-voltage energy source from the high-voltage system if the low-voltage energy source is disconnected from the HVIL-circuit.

The HVIL-circuit is arranged and configured to ensure that the electrical connection between a high-voltage power source and the high-voltage system of vehicle can be controllably and securely broken.

The present invention is based on the realization that a secure disconnection of the high-voltage power supply can be achieved by cutting the supply power to the HVIL-circuit, which is a low-voltage connection. Thereby, a user seeking to disconnect the high-voltage power source from the high-voltage power system of the vehicle does not have to operate a high-voltage switch or access the high-voltage system. The present invention also allows for a more convenient location of the emergency shut-down switch since the circuit breaker does not have to be close to the high-voltage lines or HVIL-circuit itself, and since it is easier to arrange a low-voltage switch in a suitable location of the vehicle compared to a high-voltage switch. Thereby, the claimed invention provides for a more convenient and safer shut-down of a high-power system which is advantageous for example in the event of a crash or any other emergency.

According to one embodiment of the invention, the circuit breaker is advantageously arranged to be accessible from an outside of the vehicle. By providing easy access to the circuit breaker, a user such as rescue personnel, mechanics or the like can easily find and use the circuit breaker to ensure that the high-voltage system is disconnected from the high-voltage energy source and that is safe to work on the vehicle without having to open a hood, door or the like.

According to one embodiment of the invention, the circuit breaker is preferably configured to be manually operable. Thereby, no tools are required for breaking the connection, further simplifying operation of the circuit breaker and improving user safety. The circuit breaker may also be adapted to be easily operated when wearing gloves.

According to one embodiment of the invention, the circuit breaker is configured to physically break the connection between the low-voltage energy source and the HVIL circuit. The circuit breaker may thus comprise a mechanical switching element arranged to physically sever the connection between the low-voltage energy source and the HVIL-circuit. The HVIL-circuit will then in turn break the high-voltage connection.

According to one embodiment of the invention, the circuit breaker further comprises a visual identifier configured to enhance the visibility of the circuit breaker in relation to the vehicle. This makes it easier for a user to quickly locate the circuit breaker, thereby facilitating a rapid disconnection of the high-voltage system in case of an emergency. The visual identifier may for example be a bright color, arrows or other markers, or a combination thereof.

In one embodiment of the invention, the power system comprises two circuit breakers arranged at opposing sides of the vehicle, wherein each circuit breaker is configured to break a connection between the low-voltage energy source and the HVIL circuit. In the event of an accident where the vehicle has flipped over so that one side of the vehicle is inaccessible, it is advantageous to be able to access a circuit breaker on both sides of the vehicle.

According to one embodiment of the invention, the HVIL-circuit comprises a first contactor arranged to disconnect a positive pole of the high-voltage energy source from the high-voltage system. Moreover, the HVIL-circuit may comprise a second contactor arranged to disconnect a negative pole of the high-voltage energy source from the high-voltage system.

According to one embodiment of the invention the low-voltage energy source is configured to have an operating voltage in the range of 12-48V and the high-voltage system is configured to have an operating voltage higher than 400V. The low-voltage power source may thus be a conventional vehicle battery or a battery of a heavy vehicle such as a tuck or a bus, while the high-voltage system may be a system for vehicle propulsion powered by a battery operating at 400V or above. The high-voltage system may thus comprise an electric motor for vehicle propulsion or, in the case of a working machine, one or more electric motors for operating implements or other functionalities of the working machine.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of a power system according to the present invention are mainly discussed with reference to a power system in a truck. It should however be noted that this by no means limits the scope of the present invention since the described invention is equally applicable in other types of vehicles such as cars, buses and construction vehicles. The described power system may also be used in marine applications such as boats and ships, and in other applications comprising a high-voltage power source.

Figure 1:
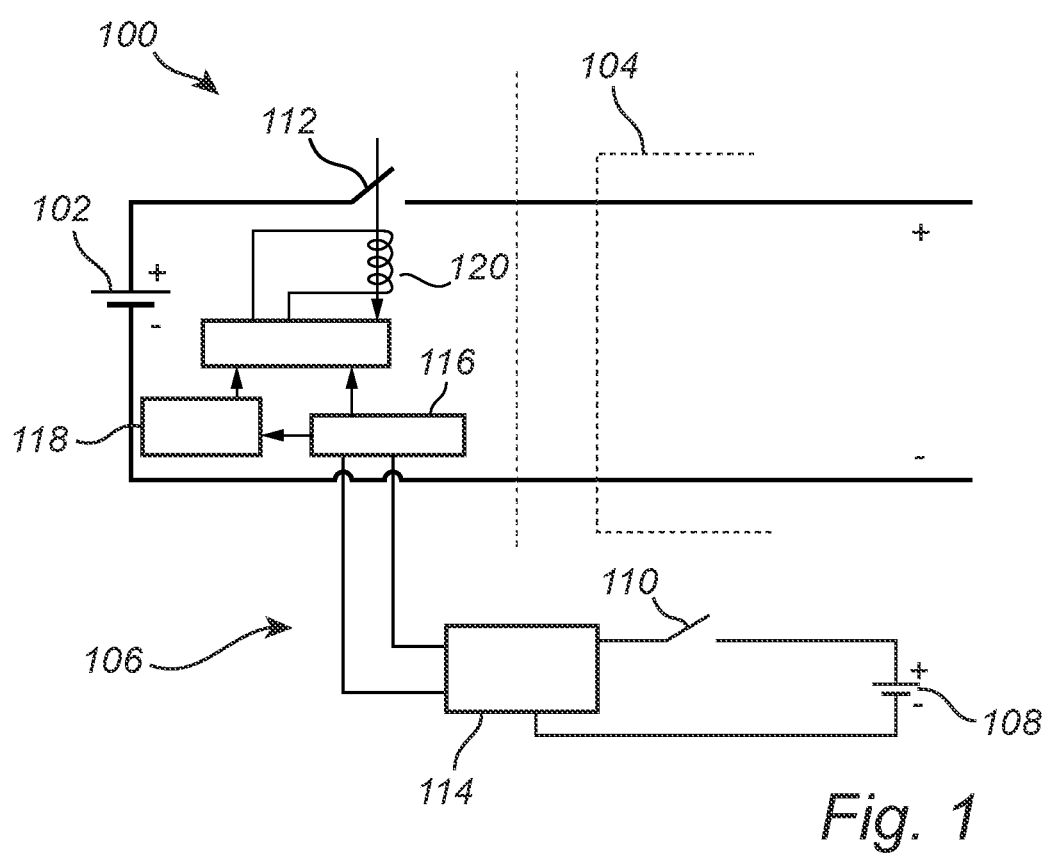
FIG. 1 is a schematic illustration of a power system according to an embodiment of the invention.

FIG. 1 schematically illustrates a circuit schematic of a power system 100 for a vehicle. Since the power system 100 relates to safety features of the high-voltage system of the vehicle, it may also be referred to as a safety system, a shut-off system or the like. The power system 100 comprises a hazardous voltage interlock loop (HVIL) circuit 106 configured to disconnect a high-voltage energy source 102 from a high-voltage system 104. The HVIL-circuit comprises an input unit 116, a control unit 118 and a contactor 112 controlled by a contactor drive 120, and the HVIL-circuit is coupled to a low-voltage energy source 108, here in the form of a battery 108, for supplying operational power to the HVIL-circuit 106. The contactor 112 is here illustrated as an electromechanical relay, but it may also be a mechanical circuit breaker. It would in principle be possible to use a solid-state semiconductor switch as contactor. However, a solid-state switch capable of withstanding the high currents of the high-voltage system may not be as cost efficient as other solutions.

The power system further comprises a circuit breaker 110 operable to break a connection between the low-voltage energy source 108 and the HVIL-circuit 106, wherein the HVIL-circuit 106 is configured to disconnect the high-voltage energy source 102 from the high-voltage system 104 if the low-voltage energy source 108 is disconnected from the HVIL-circuit.

A typical HVIL circuit consist of a current source 114, a physical output pin, a return signal pin, here provided by the input unit 116, and a measurement device and control unit 118 that can detect if the loop is closed. When a current source 114 is used, the monitoring device will know what current to expect from a closed loop, hence a very high degree of reliability can be obtained and a deviation in the current provided by the current source can be detected, resulting in that the contactor 112 is opened. The use of a HVIL-circuit in high-voltage vehicle systems is known to the skilled person and will therefore not be described in further detail herein.

In the present example, the circuit breaker 110 is located between the battery 108 and a current source 114 configured to supply a current to the HVIL-circuit. The switch 110 operated by the user may be a signal level device or a mechanical switch.

Figure 2:
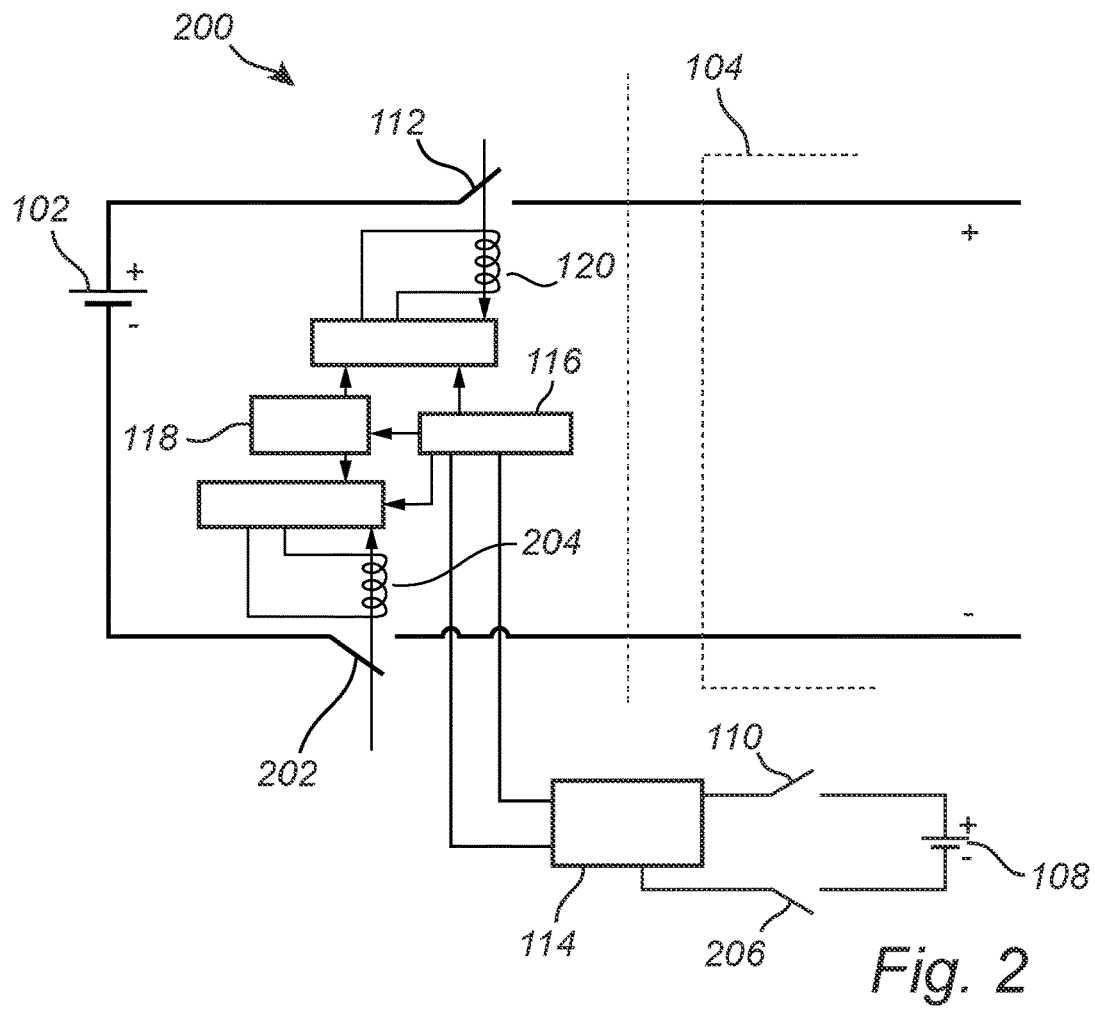
FIG. 2 is a schematic illustration of a power system according to another embodiment of the invention.

FIG. 2 schematically illustrates a schematic of power system 200 for a vehicle according to another embodiment of the invention. In FIG. 2, the power system comprises a second contactor 202 arranged to disconnect a negative pole of the high-voltage energy source 102 from the high-voltage system 104. By disconnecting both poles, the safety is increased by lowering the possibility of single-fault situations.

The power system 200 of FIG. 2 also comprises a second circuit breaker 206 for breaking the connection between the battery 108 and the current source 114. The second circuit breaker 206 may for example be arranged on the opposite side of the vehicle compared to the first circuit breaker 110 so that if a vehicle has flipped onto one side, there is always one circuit breaker accessible. In the present example, the first circuit breaker 110 is arranged to break the connection between the positive pole of the battery 108 and the power source and the second circuit breaker 206 is arranged to break the connection between the negative pole of the battery and the power source. However, it would also be possible to have multiple circuit breakers arranged on the same pole. It would also be possible to equip the system with more than two circuit breakers.

Figure 3:
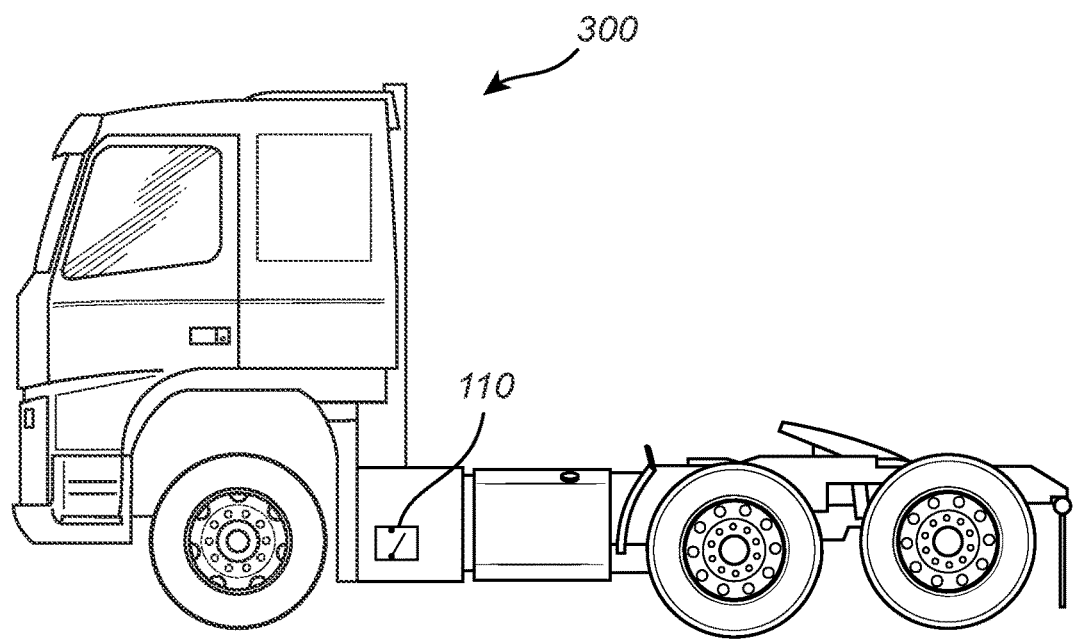
FIG. 3 is a vehicle comprising a power system according to an embodiment of the invention.

FIG. 3 is a vehicle 300 comprising a power system according to any of the aforementioned embodiments. The circuit breaker 110 of the power system 100 is here accessible from the side of the vehicle 300 and the circuit breaker can preferably be manually operated without the use of tools.

It is to be understood that the present invention is not limited to the embodiments described above and illustrated in the drawings; rather, the skilled person will recognize that many changes and modifications may be made within the scope of the appended claims.

The invention claimed is:

1. A power system for a vehicle, the power system comprising: a hazardous voltage interlock loop (HVIL) circuit configured to disconnect a high-voltage energy source from a high-voltage system; a low-voltage energy source coupled to the HVIL-circuit for supplying operational power to the HVIL-circuit; and a circuit breaker arranged to be accessible from an outside of the vehicle and manually operable to break a connection between the low-voltage energy source and the HVIL-circuit, wherein the HVIL-circuit is configured to disconnect the high-voltage energy source from the high-voltage system if the low-voltage energy source is disconnected from the HVIL-circuit.

2. The power system according to claim 1, wherein the circuit breaker is configured to physically break the connection between the low-voltage energy source and the HVIL circuit.

3. The power system according to claim 1, wherein the circuit breaker further comprises a visual identifier configured to enhance the visibility of the circuit breaker in relation to the vehicle.

4. The power system according to claim 1, comprising two circuit breakers arranged at opposing sides of the vehicle, wherein each circuit breaker is configured to break a connection between the low-voltage energy source and the HVIL circuit.

5. The power system according to claim 1, wherein the HVIL-circuit comprises a first contactor arranged to disconnect a positive pole of the high-voltage energy source from the high-voltage system.

6. The power system according to claim 5, wherein the first and/or second contactor is an electromagnetic relay switch.

7. The power system according to claim 1, wherein the HVIL-circuit comprises a second contactor arranged to disconnect a negative pole of the high-voltage energy source from the high-voltage system.

8. The power system according to claim 1, wherein the HVIL-circuit comprises a current source configured to supply a current to functional components of the HVIL-circuit.

9. The power system according to claim 1, wherein the low-voltage energy source is configured to have an operating voltage in the range of 12-48V.

10. The power system according to claim 1, wherein the high-voltage system is configured to have an operating voltage higher than 400V.

11. The power system according to claim 1, wherein the high-voltage system comprises an electric motor for vehicle propulsion.

12. A vehicle comprising a power system according to claim 1.

* * * * *